United States Patent Office 2,728,767
Patented Dec. 27, 1955

2,728,767

CHLORINATED TRIAZINES

Calvin N. Wolf, New York, N. Y., assignor to Ethyl Corporation, New York, N. Y., a corporation of Delaware No Drawing. Application June 25, 1953,
Serial No. 364,180

6 Claims. (Cl. 260—249.5)

This invention relates to the preparation of chlorinated triazine derivatives. In particular this invention resides in the direct chlorination of arylamino-substituted triazines and the products obtained thereby.

It has recently been discovered that certain derivatives of symmetrical triazine are potent fungicides. In particular, these materials can be considered as derivatives of cyanuric chloride wherein at least one of the chlorine atoms of the cyanuric chloride has been replaced by a chlorinated arylamino group. Heretofore it has not been possible to prepare these materials directly from economical raw materials and this to a large extent has prevented their widespread use as commercial fungicides. Prior processes for their manufacture have comprised the reaction between cyanuric chloride and chlorinated arylamines. The desired chlorinated aryl compound was frequently prepared only by devious methods.

In particular the mono-and dichloroanilines are difficult to prepare. It is well known that the direct chlorination of an arylamine proceeds readily and it is difficult to control the chlorination to obtain a mono- or di-chloro derivative. Thus, aniline itself upon chlorination under the mildest conditions produces as the predominate product 2,4,6-trichloroaniline. No direct methods are available for controlling the chlorination to produce in any significant yield o-chloroaniline, m-chloroaniline, p-chloroaniline or the dichloroanilines. The same considerations hold with arylamines substituted in the aryl group with other substituents such as hydrocarbon radicals, organic radicals or negative radicals.

While this process is applicable to the manufacture broadly of chloroarylamino triazines, it has been found to be particularly useful for the manufacture of 2,4-dichloro-6-(chloroarylamino)-s-triazines which have high potency as fungitoxicants.

Typical fungicides which can be prepared by the process of this invention include the 2,4-dichloro-6-monochloroarylamino-s-triazines, the 2,4-dichloro-6-dichloroarylamino-s-triazines, the 2-chloro-4,6-bis-(monochloroarylamino)-s-triazines, and the 2-chloro-4,6-bis-(dichloroarylamino)-s-triazines.

One method which has been used to obtain relatively small quantities of the above effective fungicidal materials comprises the reaction of cyanuric chloride with 1 or 2 molar equivalents of the appropriate chloroarylamine such as, for example, o-chloro-aniline, p-chloroaniline, 2,4-dichloroaniline, 2-chloro-α-naphthylamine, 4-chloro-α-naphthylamine, 2-chloro-β-naphthylamine, 4-chloro-o-toluidine, 4-chloro-2-ethylaniline, 2-chloro-p-toluidine, and the like. These chlorinated arylamines are only obtainable by indirect methods because of the unusual activating influence of the amine group on the aryl nucleus. Thus, it is not possible to obtain readily the mono- and di-chloro arylamines by direct reaction of chlorine with the arylamines. Similarly, substituted arylamines such as toluidine, ethyl aniline, methyl naphthylamine and the like immediately chlorinate to the multi-chloro derivatives and it is not possible to arrest readily the reaction at the desired point. Thus, indirect methods for preparing the arylamine precursor of the above-referred to triazine fungicides must be employed. Thus, one method for the preparation of p-chloroaniline comprises first forming the acetyl derivative of aniline, chlorinating and subsequently hydrolyzing the p-chloroacetanilide.

It is therefore an object of the present invention to provide a direct method for the preparation of chlorinated arylamino triazines. In particular, it is an object to provide a process for the manufacture of chloroarylamino chloro triazines. A more specific object of the present invention is to provide a process for the manufacture of mono- and di- Ar.-chlorinated arylamino chloro s-triazines. A further object of this invention is to prepare by economical means not heretofore available chloro-arylamino triazines suitable for use as fungicides. A further object of this invention is to prepare chloro (mixed chloroarylamino) triazines of particular utility for application in fungitoxic formulations. Still further objects will be apparent from the discussion of the invention hereinafter.

The process of this invention comprises the direct chlorination of arylamino triazines. This chlorination can be conducted either in the presence or absence of a catalyst.

A preferred embodiment of the process of this invention comprises the direct chlorination of materials having the general formula:

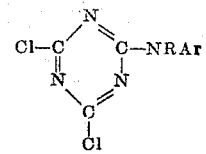

wherein Ar is an aryl radical such as phenyl, naphthyl, phenanthryl and the like such that either two positions ortho to the amino nitrogen are unsubstituted or the para position is unsubstituted, and R is hydrogen or alkyl. Thus, those positions of the Ar group activated by the exocyclic amine group are available for chlorination. A further preferred embodiment of this invention comprises the chlorination of materials of the above general formula wherein the Ar group is alkyl-substituted phenyl or alkyl-substituted naphthyl; in particular wherein the alkyl represents one or more lower alkyl radicals having from about 1 to 8 carbon atoms. In one preferred embodiment of the process of this invention the group R is hydrogen. It is also within the scope of this invention and in some instances gives improved results to chlorinate triazines wherein the R group is an alkyl radical, and in particular lower alkyl radicals containing from about 1 to 8 carbon atoms.

It has been found that the chlorination can be conducted in the presence or absence of a catalyst, depending on the nature of the raw materials and the nature of the products desired. In chlorinating those 2,4-dichloro-6-(arylamino)-s-triazines wherein the aryl radical is substituted with alkyl groups, it is preferred to employ a catalyst and upon completion of the reaction it is found that one chlorine atom has been substituted for a hydrogen atom in the ortho or para position of the aryl radical. Where the aryl radical is unsubstituted, that is, in chlorinating 2,4-dichloro-6-phenylamino-s- triazine, 2,4-dichloro - 6 - (α - naphthylamino) - s - triazine, 2,4 - dichloro - 6 - (β - naphthylamino) - s - triazine, and the corresponding phenanthryl derivatives for example, the reaction can be controlled by the absence or presence of a catalyst. Thus, in the absence of a catalyst it is found that under ordinary reaction conditions the chlorination proceeds substantially to the preparation of mono chloro derivatives and of these the p-chloro derivative predominates. Thus, in the non-catalytic direct chlorination of 2,4-dichloro-6-anilino-s-triazine a mixture of 2,4-dichloro - 6 - (4 - chloroanilino) - s - triazine and 2,4 - dichloro - 6 - (2 - chloroanilino) - s - triazine is produced in the ratio of about 4:1. If, on the other hand, 2,4-dichloro-6-anilino-s-triazine is chlorinated in the presence of a catalyst the extent of chlorination is dependent upon the reaction conditions and primarily upon the amount of chlorine employed. Thus, the principal products which can be obtained include the two monochloro products enumerated above and 2,4-dichloro-6-(2,4-dichloroanilino)-s-triazine as the principal dichlorinated product. The mono-chlorinated and di-chlorinated products in the catalytic chlorination process can be provided in any proportions desired depending upon the amount of chlorine introduced to the reaction mixture. This does not mean, however, that the ratio of the p-monochloro and o-monochloro can be controlled necessarily at will.

Thus, it is seen that a process has been provided for preferentially mono-chlorinating 2,4-dichloro-6-anilino-s-triazine by employing non-catalytic techniques. Likewise, a process has been provided for producing any desired proportion of 2,4-dichloro-6-(chloroanilino)-s-triazine and 2,4-dichloro-6-(dichloroanilino)-s-triazine by employing a catalytic technique.

When the triazine to be chlorinated contains an alkyl group on the aryl radical, the catalytic chlorination is preferred and in such an embodiment the chlorination proceeds and stops after the introduction of a single chlorine substituent in the aryl radical. As stated previously, in order for the mono-chlorination to occur, however, it is required that the aryl radical be unsubstituted with alkyl groups in the para position or in the two ortho positions. This is conveniently illustrated by considering the anilino embodiment. Thus, the 2,4-dichloro - 6 - alkylanilino - s - triazines which can be mono-chlorinated by this process include 2,4 - dichloro - 6 - (2 - alkylanilino) - s - triazine; 2,4 - dichloro - 6 - (3 - alkylanilino) - s - triazine; 2,4 - dichloro - 6 - (4 - alkylanilino) - s - triazine; 2,4 - dichloro - 6 - (2,3 - dialkylanilino) - s - triazine; 2,4 - dichloro - 6 - (2,5 - dialkylanilino) - s - triazine; 2,4 - dichloro - 6 - (2,6 - dialkylanilino) - s - triazine; 2,4 - dichloro - 6 - (3,4 - dialkylanilino) - s - triazine; 2,4 - dichloro - 6 - (3,5 - dialkylanilino) - s - triazine; 2,4 - dichloro - 6 - (2,3,5 - trialkylanilino) - s - triazine; 2,4 - dichloro - 6 - (2,3,6 - trialkylanilino) - s - triazine; 2,4 - dichloro - 6 - (3,4,5 - trialkylanilino) - s - triazine; and 2,4 - dichloro - 6 - (2,3,5,6 - tetraalkylanilino) - s - triazine, which upon chlorination produce respectively 2, 4-dichloro - 6 - (4 - chloro - 2 - alkylanilino) - s - triazine; 2,4 - dichloro - 6 - (4 - chloro - 3 - alkylanilino) - s - triazine; 2,4 - dichloro - 6 - (2 - chloro - 3 - alkylanilino) - s - triazine; 2,4 - dichloro - 6 - (2 - chloro - 4 - alkylanilino) - s - triazine; 2,4 - dichloro - 6 - (4 - chloro - 2,3 - dialkylanilino) - s - triazine; 2,4 - dichloro - 6 - (4 - chloro - 2,5 - dialkylanilino) - s - triazine; 2,4 - dichloro - 6 - (4 - chloro - 2,6 - dialkylanilino) - s - triazine; 2,4 - dichloro - 6 - (2 - chloro - 3,4 - dialkylanilino) - s - triazine; 2,4 - dichloro - 6 - (4 - chloro - 3,5 - dialkylanilino) - s - triazine; 2,4 - dichloro - 6 - (2 - chloro - 3,5 - dialkylanilino) - s - triazine; 2,4 - dichloro - 6 - (4 - chloro - 2,3,5 - trialkylanilino) - s - triazine; 2,4 - dichloro - 6 - (4 - chloro - 2,3,6 - trialkylanilino) - s - triazine; 2,4-dichloro - 6 - (2 - chloro - 3,4,5 - trialkylanilino) - s - triazine; and 2,4 - dichloro - 6 - (4 - chloro - 2,3,5,6 - tetraalkylanilino) - s - triazine.

Thus, I can prepare the following typical fungicidal compositions: 2,4-dichloro-6-(4-chloro-2-methylanilino)-s-triazine; 2,4-dichloro-6-(4-chloro - 3 - methylanilino)-s-triazine; 2,4-dichloro-6-(2-chloro-3-ethylanilino)-s-triazine; 2,4-dichloro-6-(2-chloro-4-ethylanilino)-s-triazine; 2,4-dichloro-6-(4-chloro-2-methyl - 3 - ethylanilino)-s-triazine; 2,4 - dichloro-6-(4-chloro-2,5-dipropylanilino)-s-triazine; 2,4-dichloro-6-(4-chloro - 2,6 - dibutylanilino)-s-triazine; 2,4-dichloro-6-(2-chloro - 3,4 - dihexylanilino)-s-triazine; 2,4 - dichloro-6-(4-chloro-3,5-dimethylanilino)-s-triazine; 2,4-dichloro-6-(2-chloro - 3,5 - diethylanilino)-s-triazine; 2,4-dichloro-6-(4-chloro - 2,3,5 - trimethylanilino)-s-triazine; 2,4 - dichloro-6-(4-chloro-2,3,6-trimethylanilino)-s-triazine; 2,4-dichloro-6-(2-chloro-3,4,5-trimethylanilino)-s-triazine; and 2,4-dichloro-6-(4-chloro-2,3,5,6-tetramethylanilino)-s-triazine.

To illustrate further the process of this invention, the following illustrative examples are provided.

*Example I*

2,4-dichloro-6-anilino-s-triazine was prepared by reaction of 1 mole of aniline with cyanuric chloride. Ten parts of this material was dissolved in carbon tetrachloride in an apparatus suitable for providing reflux under atmospheric pressure. While the solution was at the reflux temperature and with agitation dry chlorine gas was passed through the solution until precipitation of the product was complete. Upon filtration of the reaction mass a crystalline material having a melting point of 165–175° C. was obtained. This material contained 88 per cent of 2,4-dichloro-6-(4-chloroanilino)-s-triazine and 2 per cent of 2,4-dichloro-6-(2-chloroanilino)-s-triazine. Remaining material was not identified. The filtrate from the above operation was evaporated to provide an additional 5 parts of a product melting at 119–134° C. which was determined to consist of a mixture of 54 per cent of the 2,4-dichloro-6-(4-chloroanilino)-s-triazine and 35 per cent of the 2,4-dichloro-6-(2-chloroanilino)-s-triazine.

*Example II*

The procedure of Example I was repeated with the exception that .05 part of iodine was co-dissolved in the solution of carbon tetrachloride and 2,4-dichloro-6-anilino-s-triazine. Upon filtration of the reaction mixture after completion of the chlorination a product was obtained having a melting point of 135–140° C. This material contained 45.8 per cent chlorine corresponding to 2,4-dichloro-6-(2,4-dichloroanilino)-s-triazine. This material was identified by a mixed melting point determination with a known sample of this product. The yield of the product was better than 90 per cent.

*Example III*

An operation similar to that of Example II was conducted wherein ferric chloride replaced the iodine catalyst. A similar result was obtained by which 2,4-dichloro-6-(2,4-dichloroanilino)-s-triazine was obtained in better than 90 per cent yield.

*Example IV*

Following the procedure of Example I, 30 parts of 2,4-dichloro-6-(o-toluidino)-s-triazine was dissolved in 220 parts of benzene and the solution stirred under atmospheric reflux. 0.8 part of anhydrous ferric chloride was added as a catalyst and dry chlorine gas was passed through the mixture. Upon completion of the chlorination as evidenced by free chlorine passing through the solution, the precipitated product was recovered by filtration in 90 per cent yield. This material had a melting range of 147–161° C. and contained 37.5 per cent chlorine. The chlorine content calculated for 2,4-dichloro-6-(chloro-o-toluidino)-s-triazine is 36.7 per cent.

When 2,4-dichloro-6-arylamino-s-triazines are chlorinated as above in other solvents than carbon tetrachloride similar results are obtained. Thus, the chlorination can be conducted in benzene and a good yield of chlorinated triazine is obtained with high chlorine efficiency. The reactivity of the triazine is sufficient to permit chlorination in a solvent which is itself ordinarily considered to be susceptible of chlorination. Despite this reactivity the desired mono- and dichloro- products are obtained depending on whether or not a catalyst is employed and whether alkyl groups are present. When other solvents are employed such as chloroform, tetrachloroethane, tetrachloroethylene, trichlorobenzene, tetrachlorobenzene, o-dichlorobenzene and the like equally good results are obtained. In general, I prefer to employ nonpolar solvents which would not lead to hydrolysis of the triazine precursor or product.

In addition to the anilino and toluidino triazines which can be chlorinated as in the foregoing examples, 2,4-dichloro-6-anilino-s-triazines containing other alkyl groups can be successfully employed. Thus, the condensation product of cyanuric chloride with the ethyl anilines, the xylidenes, propylanilines, butylanilines, the isomeric amyl, hexyl, heptyl and octyl phenylamines can be employed. In addition, phenylamines substituted in accordance with the rule mentioned above with mixed alkyl radicals can be employed, thus 2-methyl-4-ethylaniline, 2-ethyl-4-(t-butyl)aniline, 2-ethyl-4-butylaniline, 2-propyl-6-isobutylaniline, 3-methyl-4-octylaniline, 3-ethyl-5-methylaniline, 3-methyl-5-isopropylaniline, 2,4-dimethyl - 6 - (t - butyl)-aniline, 2,5-dimethyl-4-ethylaniline, 2,5-diethyl-3-isopropylaniline, 2,3-trimethyl-4-octylaniline and the like upon condensation with cyanuric chloride provide 2,4-dichloro-6-alkyl-phenylamino-s-triazines which can be mono-chlorinated in the catalytic embodiment of this invention to provide 2,4 - dichloro-6-chloro-alkyl-phenylamino-s-triazines having particular utility as fungicides.

In particular, I prefer to employ orthoalkyl substituted arylamines in my process. In general I have found that substitution of a group in the position ortho to the amino nitrogen enhances the activity of the resulting chlorinated product as a fungicide.

As noted in the general formula above of one preferred reactant for conducting the process of my invention, the group R can be hydrogen or alkyl. When R is alkyl, I prefer to employ lower alkyl groups, that is, those containing 1 to about 8 carbon atoms, that is, methyl, ethyl, n-propyl, isopropyl, n-butyl, isobutyl, sec.-butyl, and the like, and the isomeric amyl, hexyl, heptyl and octyl radicals. Thus, I can employ the process of my invention to chlorinate 2,4-dichloro-6-(N-methylanilino) - s - triazine; 2,4-dichloro-6-(N-ethylanilino)-s-triazine; 2,4-dichloro-6-(N-n-propylanilino)-s-triazine; 2,4-dichloro-6-(N-isopropylanilino)-s-triazine; 2,4-dichloro-6-(N-n-butylanilino)-s-triazine; 2,4 - dichloro-6-(N-sec-butylanilino)-s-triazine; 2,4-dichloro-6-(N-amylanilino)-s-triazine; 2,4-dichloro-6-(N-hexylanilino)-s-triazine; 2,4-dichloro-6-(N-heptylanilino)-s-triazine; 2,4-dichloro - 6 - (N - octylanilino)-s-triazine; 2,4-dichloro-6-(N-methyl - 2 - methylanilino)-s-triazine; 2,4-dichloro - 6 - (N-ethyl-3-ethylanilino)-s-triazine; 2,4-dichloro-6-(N-propyl-4-methylanilino)-s-triazine; 2,4-dichloro-6-(N-isopropyl-2,3-dimethylanilino) - s - triazine; 2,4-dichloro-6-(N-methyl-2,5-diethylanilino) - s - triazine; 2,4-dichloro-6-(N-n-butyl-3-methylanilino)-s-triazine; 2,4-dichloro-6-(N-n-amyl-2-methyl-6-ethylanilino)-s-triazine; 2,4 - dichloro-6-(N-2-methylhexyl-3,4-dimethylanilino)-s-triazine; 2,4-dichloro-6-(N-n-heptyl-3,5-dipropylanilino)-s-triazine; 2,4-dichloro-6-(N-methyl - 2,3,5 - trimethylanilino) - s - triazine; 2,4-dichloro-6-(N-n-octyl-3-methylanilino)s-triazine; 2,4-dichloro-6-(N - 2 - methylpentyl-4-octylanilino)-s-triazine; 2,4 - dichloro-6-(N-methyl-2,3,6-trimethylanilino) - s - triazine; 2,4-dichloro-6-(N-isopropyl-3,4,5-triethylanilino)-s-triazine; 2,4-dichloro-6-(N-methyl-2,3-dimethyl-5,6-ethylanilino)-s-triazine, either catalytically or non-catalytically, to obtain products in accordance with the aforementioned rule.

In the catalytic embodiment of the process of my invention any of the usual chlorination catalysts can be employed. Thus, I can employ halides of the polyvalent metals such as ferric chloride, aluminum chloride, ferric bromide, aluminum bromide, antimony trichloride, antimony pentachloride, cobalt and nickel halides, zinc chloride, zinc iodide, cadmium chloride and the like. In addition to the metallic halides I can employ as catalyst iodine, boron trifluoride or combinations such as iodine chloride and chlorine bromide. Furthermore, the chlorination can be conducted in the presence of a catalytic metal such as iron or nickel or the container in which the chlorination occurs can be constructed of a catalytic metal such as iron or nickel.

The temperature employed in conducting the chlorination process of this invention is not critical. However, for convenience I prefer to employ slightly elevated temperatures to provide a reaction rate of practical magnitude.

It is convenient to conduct the process of this invention in a solvent inert to the chlorination and to conduct the chlorination at the reflux temperature of the resulting solution. Thus, I can employ solutions of the arylamino triazine in carbon tetrachloride, perchlorethylene, tetrachloroethane, chloroform, chloro-fluorinated hydrocarbons, chlorinated benzenes, xylenes and toluenes, for example, trichlorobenzene, tetrachlorobenzene, dichlorotoluene and the like having appropriate boiling points and being liquids at the temperature of operation. Thus, in general I can employ temperatures from about —20° C. to about 150° C. With the more reactive arylamino triazines I can even employ solvents which under drastic conditions would be chlorinated but which are inert under the conditions at which the arylamino triazine is chlorinated. Typical of such solvents are the hydrocarbons, both aromatic and aliphatic, such as benzene, toluene, xylene, heptanes, hexanes, kerosene, solvent naphtha and the like.

One method for conducting the process of this invention comprises solution of the arylamino triazine to be chlorinated in an appropriate solvent, raising the temperature of the solution to reflux at normal pressures and introducing gaseous chlorine below the surface of the refluxing solution. By this means good contact between the reactants is obtained without necessity of agitation. However, if it is desired to conduct the process of this invention below the reflux temperature at the pressure selected it is convenient to supply agitation to insure efficient utilization and distribution of the chlorine. The process of this invention can be conducted as a batch operation or as a continuous operation. In most instances the chlorinated product appears in the reaction mixture as a crystalline precipitate. Thus, a convenient method of conducting my process comprises flowing a solution of the arylamino triazine into a reaction zone wherein gaseous chlorine is introduced and the resulting reaction mixture is continuously discharged to a recovery zone wherein the solids are removed by filtration, centrifugation or other conventional means of recovery. In certain instances it may be necessary to cool the reaction mixture after leaving the reaction zone and prior to entering the recovery zone. Furthermore, an evaporation step may be introduced prior to the recovery zone or a cooling or evaporation step can be introduced after the recovery zone, thereupon passing the so-treated mother liquor to a secondary recovery zone where further product is obtained. Obvious economies can be further instituted by recycling the recovered solvent.

I claim:

1. A process for the manufacture of Ar-chlorinated arylamino chloro-s-triazines which comprises the direct chlorination with chlorine in a chlorinated hydrocarbon solvent at a temperature from about —20° C. to about 150° C., said chlorination in the ortho and para positions, of materials having the general formula

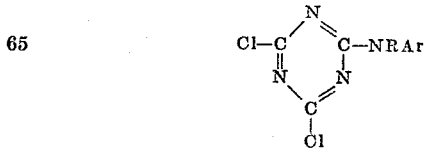

wherein Ar is an aryl hydrocarbon group, and wherein said Ar group is activated in the ortho positions, when an alkyl group is in the para position, and wherein said Ar group is activated in the para position when an alkyl group is in the ortho position, whereby chlorination occurs at said activated positions, and wherein R is selected from the group consisting of hydrogen and lower alkyl radicals containing from about 1 to 8 carbon atoms.

2. A process for the manufacture of mono-Ar-chlorinated arylamino chloro-s-triazines which comprises the direct mono-chlorination with chlorine in a chlorinated hydrocarbon solvent at a temperature from about —20° C. to about 150° C., said chlorination of materials having the general formula:

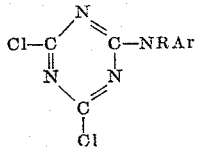

wherein Ar is selected from the group consisting of lower alkyl phenyl, lower alkyl naphthyl, and lower alkyl phenanthryl groups, said lower alkyl groups having 1 to 8 carbon atoms, inclusive, wherein said Ar group is activated in the ortho positions, when said alkyl group is in the para position, and wherein said Ar group is activated in the para position when said alkyl group is in the ortho position, whereby monochlorination occurs at said activated positions, and wherein R is selected from the group consisting of hydrogen and lower alkyl radicals containing from about 1 to 8 carbon atoms, in the presence of a catalyst selected from the group consisting of polyvalent metal halides, iodine, boron trifluoride, iodine chloride, chlorine bromide, iron and nickel.

3. A process for the manufacture of predominantly mono-Ar-p-chlorinated arylamino-s-triazines which comprises the direct non-catalytic monochlorination with chlorine in a chlorinated hydrocarbon solvent at a temperature from about —20° C. to about 150° C., said chlorination of materials having the general formula:

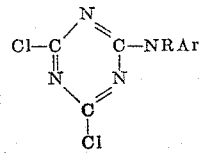

wherein Ar is slected from the groups consisting of phenyl, naphthyl, and phenanthryl groups, and wherein R is selected from the group consisting of hydrogen and lower alkyl radicals containing from about 1 to 8 carbon atoms.

4. A process for the manufacture of Ar-chlorinated arylamino chloro-s-triazines which comprises the direct chlorination with chlorine in a chlorinated hydrocarbon solvent at a temperature from about —20° C. to about 150° C., said chlorination of materials having the general formula:

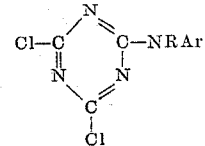

wherein Ar is selected from the group consisting of phenyl, naphthyl, and phenanthryl groups, and wherein R is selected from the group consisting of hydrogen and lower alkyl radicals containing from about 1 to 8 carbon atoms, whereby chlorination occurs at the ortho and para positions of said Ar group, in the presence of a catalyst selected from the group consisting of polyvalent metal halides, iodine, boron trifluoride, iodine chloride, chlorine bromide, iron and nickel.

5. A process for the manufacture of a mixture of 2,4-dichloro-6-(4-chloroanilino)-s-triazine and 2,4-dichloro-6-(2-chloroanilino)-s-triazine wherein said 2,4-dichloro-6-(4-chloroanilino)-s-triazine and said 2,4-dichloro-6-(2-chloroanilino)-s-triazin are present in the ratio of about 4:1, which comprises the non-catalytic direct chlorination with chlorine of 2,4-dichloro-6-anilino-s-triazine dissolved in an inert chlorinated hydrocarbon solvent at the atmospheric reflux temperature of said solvent, said temperature not exceeding about 150° C.

6. A process for the manufacture of a mixture of 2,4-dichloro-6-(4-chloroanilino)-s-triazine and 2,4-dichloro-6-(2-chloroanilino)-s-triazine wherein said 2,4-dichloro-6-(4-chloroanilino)-s-triazine and said 2,4-dichloro-6-(2-chloroanilino)-s-triazine are present in the ratio of about 4:1, which comprises the non-catalytic direct chlorination with chlorine of 2,4-dichloro-6-anilino-s-triazine dissolved in an inert chlorinated hydrocarbon solvent at the atmospheric reflux temperature of said solvent, said temperature not exceeding about 150° C.

References Cited in the file of this patent

UNITED STATES PATENTS

| | | |
|---|---|---|
| 2,184,883 | Muskat | Dec. 26, 1939 |
| 2,184,886 | Muskat | Dec. 26, 1939 |
| 2,184,888 | Muskat | Dec. 26, 1939 |
| 2,472,361 | Arsen | June 7, 1949 |
| 2,654,720 | Cohen | Oct. 6, 1953 |
| 2,671,787 | Bortnick | Mar. 9, 1954 |